United States Patent
Sarkar et al.

(10) Patent No.: US 9,825,821 B2
(45) Date of Patent: Nov. 21, 2017

(54) SYSTEM AND METHOD FOR A FACET SECURITY MODEL

(71) Applicant: CISCO TECHNOLOGY, INC., San Jose, CA (US)

(72) Inventors: Dipankar Sarkar, Saratoga, CA (US); Oleg Danilov, Clayton, CA (US); Alok Batra, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 495 days.

(21) Appl. No.: 14/039,709

(22) Filed: Sep. 27, 2013

(65) Prior Publication Data

US 2015/0095474 A1    Apr. 2, 2015

(51) Int. Cl.
G06F 15/173      (2006.01)
H04L 12/24       (2006.01)
H04L 29/06       (2006.01)

(52) U.S. Cl.
CPC ............ H04L 41/28 (2013.01); H04L 63/102 (2013.01); H04L 63/20 (2013.01)

(58) Field of Classification Search
CPC ...... G06F 21/62; H04L 63/00; H04L 63/0815
See application file for complete search history.

(56) References Cited

U.S. PATENT DOCUMENTS

| | | | |
|---|---|---|---|
| 6,892,307 B1 | 5/2005 | Wood et al. | |
| 8,131,875 B1* | 3/2012 | Chen | H04M 1/72522 707/E17.121 |
| 8,533,796 B1* | 9/2013 | Shenoy | H04L 63/0815 380/229 |
| 9,225,682 B2 | 12/2015 | Sarkar et al. | |
| 2009/0217354 A1* | 8/2009 | Blum | H04L 29/12594 726/3 |
| 2011/0088081 A1* | 4/2011 | Folkesson | G06Q 10/06 726/5 |
| 2013/0067303 A1 | 3/2013 | Kantor et al. | |
| 2014/0181965 A1* | 6/2014 | Kling | G06F 21/6218 726/21 |

(Continued)

OTHER PUBLICATIONS

Jeff Barr, AWS Identity and Access Management—Now With Identity Federation, Aug. 4, 2011, AWS Official Blog, p. 1-8.*

(Continued)

*Primary Examiner* — Lance Leonard Barry
*Assistant Examiner* — Mohammad Yousuf A Mian
(74) *Attorney, Agent, or Firm* — Polsinelli PC

(57) ABSTRACT

An example method is provided and includes receiving a request to issue a facet; identifying an endpoint with a resource for which the facet is valid; identifying a set of actions capable of being performed on the resource; creating the facet using the set of actions; and issuing the facet. In other embodiments, the method may include receiving an initial request from an entity for the facet; determining whether the entity has authorization to make the initial request; and request a facet server module to issue the facet. In yet other embodiments, the facet has a condition, and the condition is at least one of a count of use, a time duration, and a periodic time duration. Additionally, in certain cases, determining whether the entity has authorization to make the initial request comprises evaluating validity information against a policy.

14 Claims, 3 Drawing Sheets

(56) References Cited

U.S. PATENT DOCUMENTS

2015/0101034 A1 4/2015 Sarkar et al.

OTHER PUBLICATIONS

U.S. Appl. No. 14/045,350, filed Oct. 3, 2013 entitled "System and Method for a Facet Security Framework," Inventors Dipankar Sarkar, et al.
USPTO dated Jul. 28, 2015 Non-Final Office Action from U.S. Appl. No. 14/045,350.
"Amazon Simple Storage Service Developer Guide, API Version Mar. 1, 2006,"Mar. 2006, Amazon Web Services, http://awsdocs.s3.amazonaws.com/S3/latest/s3-dg-pdf.
Barr, Jeff, "AWS Identity and Access Management—Now With Identity Federation," AWS Official Blog, Aug. 2011 http://aws.amazon.com/blogs/aws/aws-identity-and-access-management-now-with-identity-federation.
Barr, Jeff, "Identity Federation to the AWS Console," AWS Official Blog, Jan. 2012 http://aws.amazon.com/blogs/aws/category/awslam/page/3/.
"AWS Security Token Service API Reference, API Reference, API Version Jun. 15, 2011," Jun. 2011, Amazon Web Services http://awsdocs.s3.amazonaws.com/STS/latest/sts-api-pdf.
Varia, Jinish, "Migrating Your Existing Applications to the AWS Cloud," Amazon Web Services, Oct. 2010; Media.amazonwebservices.com/CloudMigration-main.pdf.
EMC Corporation, "RSA Establishes Cloud Trust Authority to Accelerate Cloud Adoption," Press Release, ©2012, 3 pages; http://www.emc.com/domains/rsa/index.htm?id=11320.
EMC Corporation, "RSA Cloud Trust Authority: To see things as they might be . . . not as they are," ©2011, 4 pages; https://blogs.rsa.com/rsa-cloud-trust-authority-to-see-things-as-they-might-be-not-as-they-are/.
USPTO dated Jul. 28, 2015 Notice of Allowance from U.S. Appl. No. 14/045,350.

\* cited by examiner

SYSTEM AND METHOD FOR A FACET SECURITY MODEL

TECHNICAL FIELD

This disclosure relates in general to the field of security and, more particularly, to managing a security facet in a network environment.

BACKGROUND

Software applications are moving towards a cloud model. The existing business models in cloud include two party systems, where there are a provider and a consumer of resources. One trend is evolving towards a multiple party scenario with application mash-ups and compositions of resources. This is referred to as a federated scenario. In a federated scenario, multiple domains can participate with multiple roles in the cloud. Existing policy based authorization systems do not work in a multi-domain federated authorization environment, as they have been designed to work in an enterprise authorization setting. The users are on-boarded from participating domains in the domain, where the resources exist. This can result in replication of subscriber databases and access controls.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method is provided that include receiving a request to issue a facet; identifying an endpoint with a resource for which the facet is valid (e.g., acceptable, verified, coincident with other data, etc.); identifying a set of actions capable of being performed on the resource; creating (e.g., generating, writing, storing, etc.) the facet using the set of actions; and issuing (e.g., generating, providing, offering, communicating, sending, transmitting, etc.) the facet. The term 'endpoint' is meant to include any type of node, server, provider, etc. that exists in the network, or that can initiate a communication in the network, as discussed herein. Additionally, the broad term 'facet' (inclusive of all of its permutations) encompasses any type of key, token, identifier, password, symbol, keyword, pin, code or object (potentially encrypted), token, handshake mechanism, or any other suitable element that can control or at least affect access to, management of, and/or control for a given resource.

The set of actions can include (but is not limited to) any access, use of, consumption of, utilization of, entry to, the ability to publish to, write to, or read the resource. The resource can include a service, a computing resource, a memory, a processor processing time, data throughput, bandwidth, power, device usage, media, content of any kind, a virtual machine, a security tool, or any other suitable resource sought to be used.

In other embodiments, the method may include receiving an initial request from an entity for the facet; determining whether the entity has authorization to make the initial request; and request a facet server module to issue the facet. In yet other embodiments, the facet has a condition, and the condition is at least one of a count of use, a time duration, and a periodic time duration. Additionally, in certain cases, determining whether the entity has authorization to make the initial request comprises evaluating validity information against a policy. The policy can include any set of rules, procedures, constructs, a framework, a model, a plan, a set of provider instructions, regulations, a plan, etc. that may be employed in such a scenario. The method also includes allowing the action (e.g., accessing the resource, publishing any object, using the resource in some manner, etc.).

Example Embodiments

Figure 1:
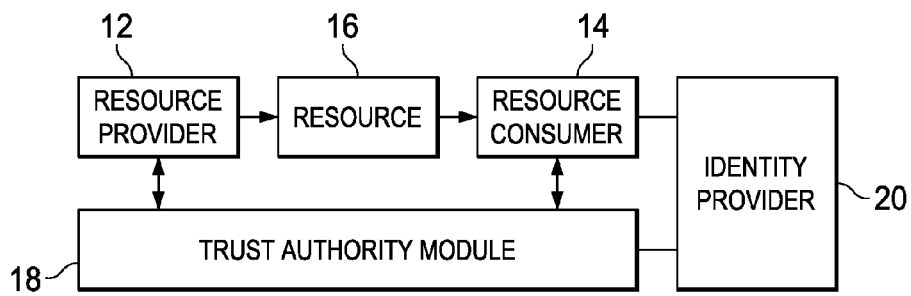
FIG. 1 is a simplified block diagram of a cloud in accordance with at least one example embodiment.

FIG. 1 is a simplified block diagram of an example cloud environment in accordance with at least one example embodiment of the present disclosure. The broad term 'cloud environment' is meant to include cloud computing, virtual computing, the 'cloud' more generally, and the like. In certain embodiments, the cloud environment includes a large number of computers connected through a real-time communication network (typically the Internet). In addition, the cloud environment can include distributed computing over a network that can include the ability to run a program on many connected computers at the same time. The cloud environment can include network-based services that appear to be provided by real server hardware, but which may actually be performed (at least in part) by one or more virtual components (e.g., simulated by software running on one or more computing machines). Such virtual components do not necessarily have a physical existence and, hence, can be readily managed, deployed, moved around, scaled up (or down), etc. without affecting end users, network operations, physical deployments, etc.

In the example of FIG. 1, the cloud environment can include a resource provider 12, a resource consumer 14, a resource 16, a trust authority module 18, and an identity provider 20. In an embodiment, resource provider 12 may be a provider of resource 16 to be offered to consumer 14. For example, resource provider 12 may be a domain, website, company enterprise system, or any other entity that may provide resource 16. In a specific example, resource consumer 14 may be any entity that obtains or uses resource 16. Resource 16 may be, for example, services, memory, processing time, data throughput, power, device usage, media, or any other type of content. In an example embodiment, trust authority module 18 may be a set of policies to govern the access to resource 16. It can act on behalf of the resource owner. Identity provider 20 may be able to authenticate resource provider 12 and resource consumer 14. Various types of routers and switches may be used to facilitate communications amongst any of the elements of FIG. 1. Also depicted in FIG. 1 are a number of pathways (e.g., shown as solid lines) between the elements for propagating any suitable data traffic.

In a specific embodiment, identity provider 20 may be configured to authenticate the identity of resource consumer 14 and/or resource provider 12. As there may be a multitude of identity providers following different standards, for example, SAML v1, v2, Liberty or Shibboleth, an identity provider module may be put in place to communicate with the different systems. The identity provider module may use a data dictionary to resolve the differences of the attributes in these systems.

In certain embodiments, the modules and elements discussed herein for offering or facilitating the facet security may be implemented in a federated architecture. A federated architecture (FA) is a pattern that describes an approach to enterprise architecture that allows interoperability and information sharing between semi-autonomous de-centrally organized lines of business (LOBs), information technology systems, and applications.

Figure 2:
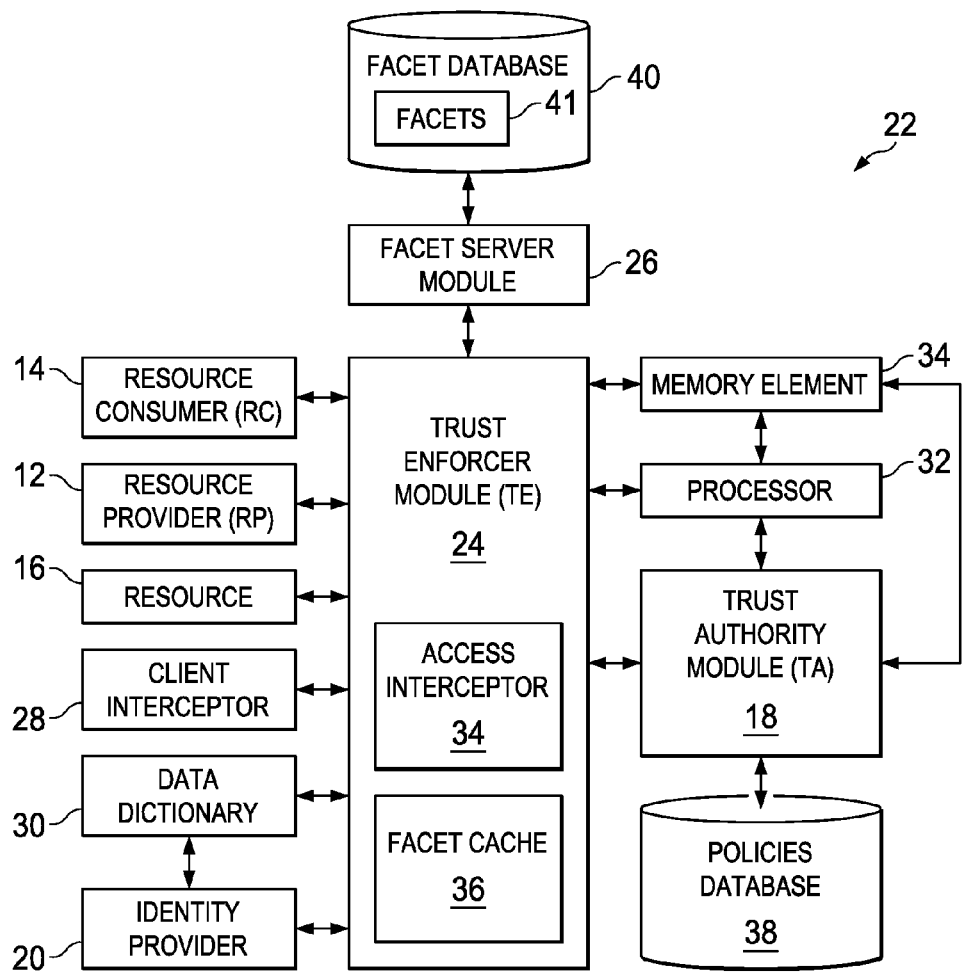
FIG. 2 is a simplified block diagram of a security framework in accordance with at least one example embodiment.

FIG. 2 is a simplified block diagram of a security framework 22 in accordance with at least one example embodiment. Security framework 22 may include a number of elements or modules. In the example of FIG. 2, security framework 22 includes resource provider 12, resource consumer 14, resource 16, trust authority module (TA) 18, a trust enforcer module (TE) 24, a facet server module 26, a client interceptor 28, and a data dictionary 30.

In an embodiment, TE 24 may be configured to restrict and allow access to resource 16 using facets. TE 24 may include access interceptor 34 and facet cache 36. Access interceptor 34 may be a module configured to intercept a request to access or publish a resource in a cloud. Facet cache 36 may be storage for all the facets pertaining to TE 24. Facets in the store may be received from facet server module 26 and held until they expire or invalidated providing for reduced remote calls to facet server module 26. TE 24 may also include client interceptor 28. Client interceptor 28 may be configured to attach necessary facets to access a resource when an entity within security framework 22 is acting as a resource consumer as part of resource consumption.

In an embodiment, TA 18 may be a trustee of a set of resources placed under its control. TA 18 may have access policies configured for each resource. TA 18 may include policies database 38. Policies database 38 may have the different policies, rules, and regulation related to different facets and access to different resources and services. In an embodiment, facet server module 26 may be responsible for creating, expiring, and revoking facets 41. Facets 41 may be created at the request of TA 18 and also distributed to TE 24.

A facet within facets 41 is an object that contains information to provide access to a resource. It can be like a bearer key that allows access to the entity that is holding the key or the facet could be endorsed to a particular subject. The subject is verified to be the requester at the point of access. A subject is an entity requesting access to a resource. It can be a combination of one or more of an identity and identity attributes (role, groups etc.). The facet may be created for a target that is identified by an address and a combination of attributes. It has a validity information which could be for a duration, a periodic timeframe like business hours on workdays or valid for a number use. If the facet has come through the delegation of authorization, the delegator information is present. The authorizations are defined using a capability object.

The facet may be referred to as a facet key, key, facet token, and/or token. In different embodiments, different kinds of facets may be issued. For example, this can include, but is not limited to, initial facets, initial publishing facets, resource facets, initial publishing resource facets, and other types of facets for different uses. Additionally, for example, some differently named facets may be a similar facet, but with different properties. For example, an initial facet may be similar to a resource facet, where the resource facet includes access to one or more specific resources.

Figure 3:
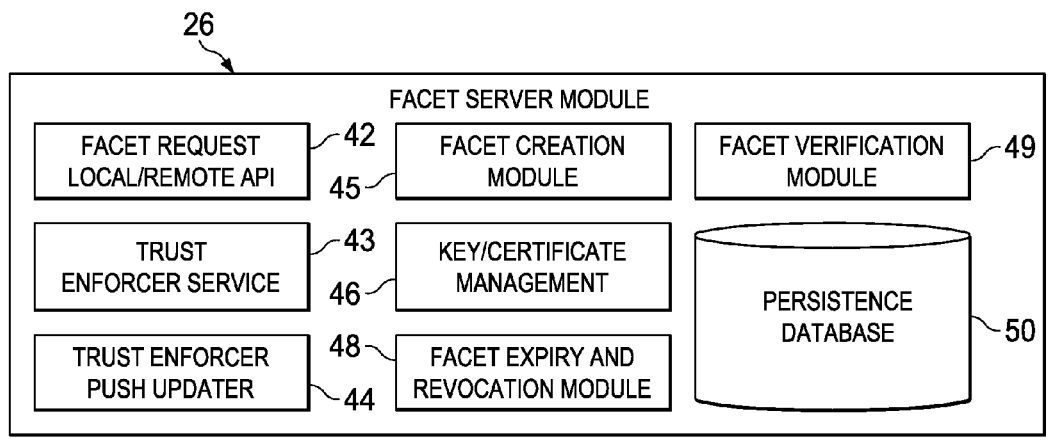
FIG. 3 is a simplified block diagram of a facet server module in accordance with at least one example embodiment.

FIG. 3 is a simplified block diagram of a facet server module in accordance with at least one example embodiment. Facet server module 26 may include a number of elements or modules. In the example of FIG. 1, facet server module 26 includes facet request local/remote application programming interface (API) 42, trust enforcer service 43, trust enforcer push updater 44, facet creation module 45, key/certificate management 46, facet expiry and revocation module 48, facet verification module 49, and persistence database 50.

In an embodiment, facet request local/remote API 42 may be a request handler accepting requests for creation of facets. The local API may be meant for in process clients, where the remote API may be for clients from other processes. Trust enforcer server 43 may be configured to serve the information regarding all of the facets that TE 24 is responsible for during startup of TE 24 or any time TE 24 requests the information.

In a specific embodiment, trust enforcer push updater 44 may be a client module to TE 24 that may push updates, such as new facets and revoked facet information, to TE 24. Facet creation module 45 may be configured to create the actual facet based on the facet issuance policies for the capability of a client, action on a resource, and validity duration.

In an example embodiment, key/certificate management 46 may be responsible for maintaining a secured database to keep and maintain any signature and encryption keys and certificates. Facet expiry and revocation module 48 may be configured to continuously monitor for expired facets and keeps track of revoked facets. Facet expiry and revocation module 48 may also be configured to maintain the revocation information for the life of the revoked facet. Persistence database 50 may be configured to keep persistence for all facet server modules. Persistence database 50 may also be a primary storage and single source of truth of all facets issued by facet server 26.

Figure 4:
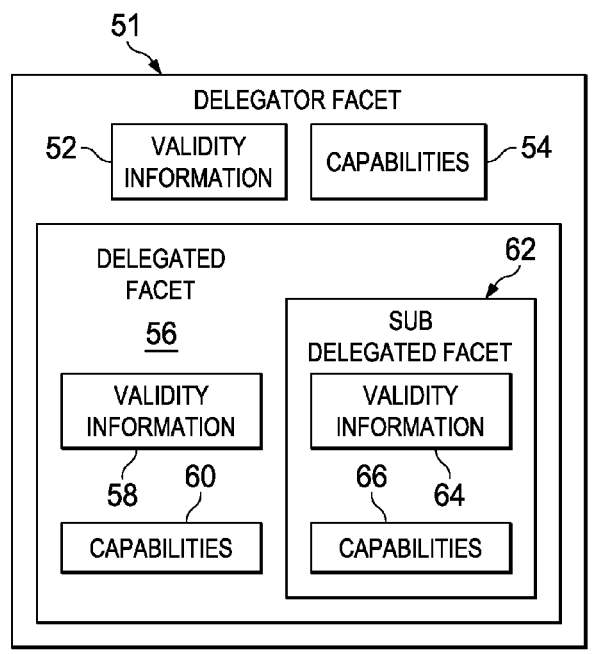
FIG. 4 is a simplified block diagram of a delegation environment in accordance with at least one example embodiment.

FIG. 4 is a simplified block diagram of a delegation environment in accordance with at least one example embodiment. The delegation environment may include a number of elements or modules. In the example of FIG. 1, the delegation environment includes a delegator facet 51, a delegated facet 56, and a sub-delegated facet 62.

In an embodiment, delegator facet 51 may be a facet that is to be delegated to another entity in some form. Delegator facet 51 may have validity information 52 and capabilities 54. Validity information 52 may be compared against different policies. Validity information 52 may indicate a delegate for delegate facet 56, the delegator, information about expiration of delegator facet 51, as well as an address for delegator facet 51. Capabilities 54 may indicate what services and resources the holder of delegator facet 51 may perform action upon.

Delegated facet 56 may be delegated from delegator facet 51. Delegated facet may include validity information 58 and capabilities 60, which may include authorizations, permissions, tools, competences, faculties, etc. Likewise, Sub-delegated facet 62 may be delegated from delegated facet 56. Sub-delegated facet 62 may include validity information 64 and capabilities 66. Delegated facet 56 may have less validity and capabilities than delegator 51. Likewise, sub-delegated facet 62 may have less validity and capabilities than delegated facet 56.

As discussed herein, delegated facet 56 is within delegator facet 51, and sub delegator facet 62 is within delegated facet 56. The facets may be shown within each other to illustrate that delegated facet 56 may have equal or less capabilities 60 as capabilities 54 of delegator facet 51. A holder of a facet can delegate a subset of his authorizations to another entity. A new facet is generated to represent this (sub) authorization. This delegation can also reduce the validity from the parent facet. The delegator is also added in the new facet along with the delegate information. This allows a chain of delegation to be established and recorded for audit purposes.

A facet delegation is created when a requester presents the delegator facet, capability-limiting information along with validity to the relevant Trust authority module. The Trust authority module will than evaluate the policies regarding issuance of such authorization. If the issuance policies exist on a remote server, it will communicate with that server and get the issuance authorized. If permitted, the trust authority module will request the facet server module to issue such the delegated facet. The lifespan of a delegated facet is normally less than that of the delegator facet.

Figure 5:
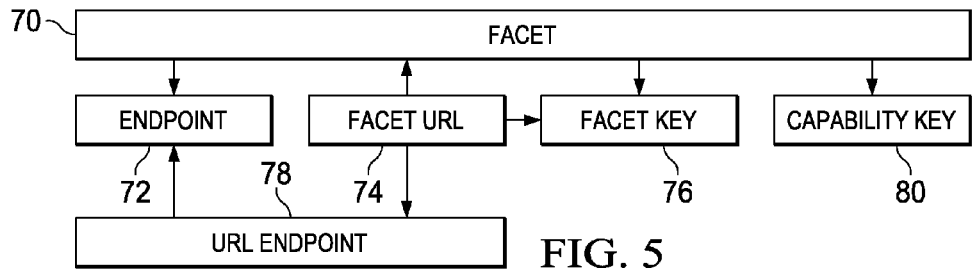
FIG. 5 is a simplified block diagram of a facet environment in accordance with at least one example embodiment.

FIG. 5 is a simplified block diagram of a facet object in accordance with at least one example embodiment. The facet environment may include a number of elements or modules. In the example of FIG. 5, the facet object includes a facet 70, an endpoint 72, a facet URL 74, a facet key 76, a URL endpoint 78, and a capability key 80. In an embodiment, facet 70 may be an object defining the authorizations of a holder in the jurisdiction of a security framework (cloud). Additionally, facet 70 may be a token or key that enables entry and authorization into a service to obtain a resource. Facet 70 may be signed by facet server module 26. Facet 70 may have different attributes. For example, facet 70 may have conditions of a count of use, time duration, and/or periodic time duration. A count of use may indicate, for example, that facet 70 may be used a certain number of times before it expires. Time duration may indicate, for example, that facet 70 may be valid for a certain length of time before it expires. Periodic time duration may indicate, for example, that facet 70 may be valid during certain periods of time that may repeat.

In an embodiment, facet key 76 may be a representation of facet 70 that can be handed over to a client for use. Facet key 76 may be the actual token used in security framework 22. Facet key 76 may be a unique identifier and can be in the form of a URL. In an embodiment, facet 70 may be created through the associations of various entities. Endpoint 72 may be a resource or service point, where facet 70 is valid. Endpoint 72 may be an entry point to a resource, service, process, and/or entity. URL endpoint 78 may be a URL uniquely referencing endpoint 72. Facet URL 74 may be an invocation of a facet request. For example, facet URL 74 may be a URL that embodies an action request on a resource along with parameters and the facet for authorization. Such a request may be preassembled and can be invoked directly without any addition. Capability key 80 may be a token containing the rights and authorizations granted to facet 70 or the holder of facet 70.

In an embodiment, facet 70 may also be referred to as a facet object. Facet 70 may be a permit or set of permits to perform an action or a set of actions on a set of resources under some binding conditions. In some embodiments, a binding condition of time may be mandatory in facet 70. In different embodiments, other binding conditions may be present, depending upon the issued policy. Facet 70 may embody the permission for the resource. The resource may be defined using a URL. Facet key 76 may be a unique identifier and can be in the form of a URL. In an embodiment, facet URL 74 may be for the convenience of invoking an action on a resource using facet 70 and all the input parameters needed for the action; all integrated in the facet URL 74.

In operation, and in an example embodiment, a facet is the unit of authorization into the system. Broadly, it is a combination of a target and capabilities. Facet 70 has validity information. Once a facet is expired, the resource is no longer accessible through that facet. It can be made accessible using some other valid facet. The validity is expressed in three ways:
  1. Count of use;
  2. Time duration; and
  3. Periodic time duration, such as, for example, business hours.

The full validity can be defined as a combination of the above parameters.

Facet 70 can be a bearer facet that provides access to whichever entity is holding it. Alternatively, facet 70 could be endorsed to a particular subject. The subject is verified to be the requester at the point of access. A subject is an entity requesting access to a resource. It can be a combination of one or more of an identity and identity attributes (such as a role, groups, etc.). Facet 70 may be created for a target that is identified by an address and a combination of attributes. If facet 70 has come through the delegation of authorization, the delegator information is present. The authorizations may be defined using a capability object.

In an embodiment, facet URL 74 may be a derived class that uses a URL to uniquely identify facet 70. Facet 70 may hold the target resource and permissions for the client invoking the facet URL 74. When a request is made with facet URL 74, facet URL 74 may uniquely define the request, whether it is for a resource access or a service invocation. Either this can be achieved by having the capability define this invocation unambiguously or parameter values can be added to make it unambiguous.

In an embodiment, facet key 76 and facet URL 74 may be transported from one entity to another in a secure manner. Once the destination entity is determined correctly, a secure channel like HTTPS can be established to communicate the facet. Alternatively, a dual key encryption can be used to encrypt the facet key or URL and transported through an unsecure channel.

For example, the following mechanism may endure point-to-point security of the facet:

RecvPub(SendPvt(Facet))=>SendPub(RecvPvt(encryptedFacet))=>Facet

While sending, the sender may encrypt the facet with the sender's private key. This binds the sender's entity to the information. It is then encrypted with the receiver's public key. This ensures that only the receiver can decrypt the information. This encrypted data is now sent to the receiver. The receiver uses the receiver's private key to decrypt the information and then uses the sender's public key to decrypt the data to get the original facet information.

Figure 6:
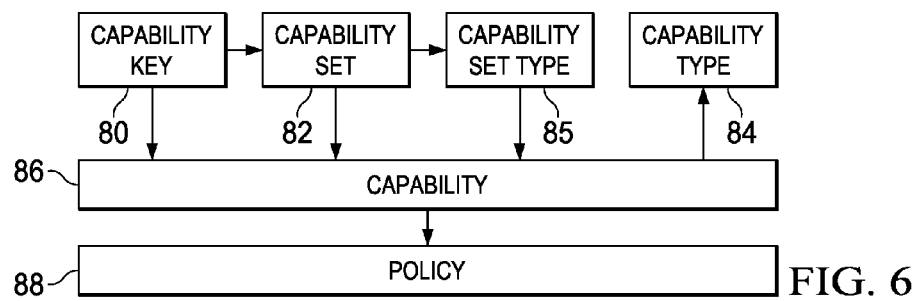
FIG. 6 is a simplified block diagram of a capability environment in accordance with at least one example embodiment.

FIG. 6 is a simplified block diagram of a capability environment in accordance with at least one example embodiment. The capability environment may include a number of elements or modules. In the example of FIG. 1, the capability environment includes capability key 80, a capability set, a capability type 84, a capability set type 85, a capability 86, and a policy 88.

In an embodiment, capability key 80 may reference a capability object. Capability key 80 may uniquely identify a capability object, such as capability 86. Capability set 82 may be a set of capabilities embodied in one capability key 80 (i.e., capability object). Capability type 84 may be a parametric for forms of capability representation. A substitution of parameters in the forms with values results in a capability definition. Capability set type 85 may be a set of capability types embodied in a single capability key 80 (i.e., capability object).

In an embodiment, capability 86 may be the capabilities of capability key 80. Those capabilities may reference policy 88. Policy 88 may be the rules related to the different capabilities. Capability type 84 may be a parameterized template that can be filled up to create a capability specification. The aggregation of these may be capability set type 85. This provides a way of creating a model-based security. The policy/rules are expressed in a policy/rules based language.

Figure 7:
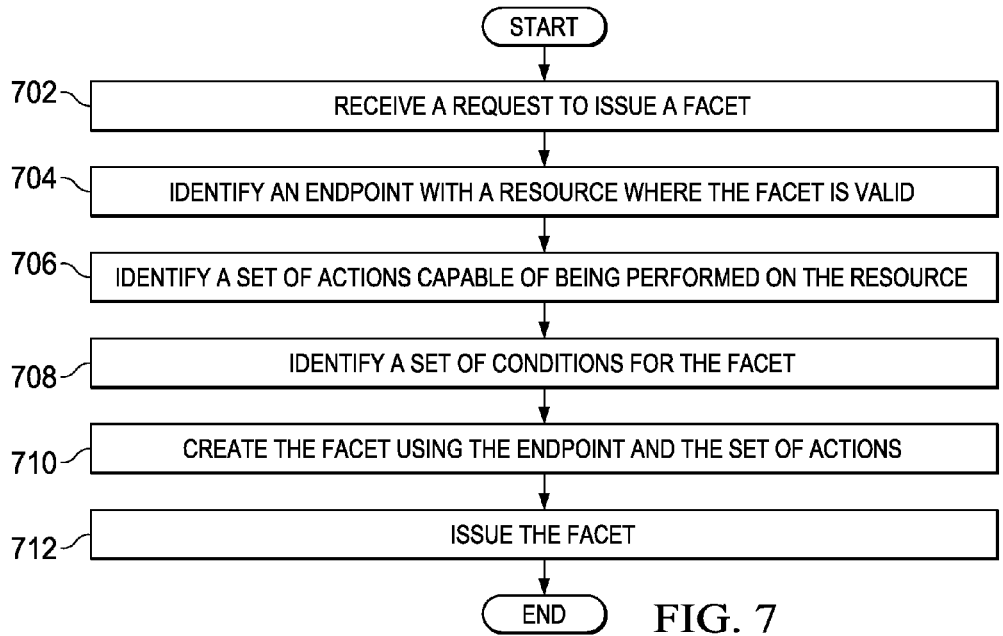
FIG. 7 is a flow diagram illustrating activities associated with creating a facet in a security framework in accordance with at least one example embodiment.

FIG. 7 is a flow diagram illustrating activities associated with creating a facet in a security framework in accordance with at least one example embodiment. In at least one example embodiment, there is a set of operations that corresponds to the activities of FIG. 7. An apparatus, for example, security framework 22 of FIG. 2, or a portion thereof, may utilize the set of operations. The apparatus may comprise means, including, for example processor 32 of FIG. 2, for performing such operations. In an example embodiment, an apparatus, for example security framework 22 of FIG. 2, is transformed by having memory, for example memory element 34 of FIG. 2, comprising computer code configured to, working with a processor, for example processor 32 of FIG. 2, cause the apparatus to perform set of operations of FIG. 7.

At block 702, a trust authority module (TA) may receive a request to issue a facet. At block 704, the TA may identify an endpoint with a resource, where the facet is valid. At block 706, the TA may identify a set of actions capable of being performed on the resource. For example, the set of actions may be an add function, delete function, modify function, or some other type of process or action. Additionally, the set of actions may be provided by a policy. At block 708, the TA may create the facet using the endpoint and the set of actions. Additionally, in different embodiments, a capability set is also used in creating the facet. Further, in even more embodiments, a facet key is also created. The facet key may be a URL referencing the facet. At block 710, the TA may issue the facet.

Additionally, before the steps of FIG. 7, an apparatus may receive an initial request from an entity for the facet. The apparatus may determine whether the entity has authorization to make the initial request. Then, the apparatus may request the facet server module to issue the facet if the entity has the authorization.

In another embodiment, an apparatus may identify a capability type for the facet; modify the capability type with values related to the facet to form a specific capability type; and add the capability type to a capability set type, wherein the capability set type is associated with the facet. In yet a further embodiment, an apparatus may create a URL endpoint uniquely identifying the endpoint, wherein the URL endpoint comprises an action request; identify parameters for the action request; and creating a facet URL from the URL endpoint, the parameters, and the facet.

In at least one example embodiment, TE 24, TA 18, facet server module 26, and/or security framework 22 more generally may include software to achieve or to support the operations as outlined herein in this document. In other embodiments, this feature may be provided externally to any of the aforementioned elements, or included in some other network element to achieve this functionality. Alternatively, several elements may include software (or reciprocating software) that may coordinate in order to achieve the operations, as outlined herein. In still other embodiments, any of the devices of the FIGURES may include any suitable algorithms, hardware, software, components, modules, interfaces, or objects that facilitate in managing a conversation.

It is imperative to note that the FIGURES are indicative of just some, of the multitude, of example implementations of TE 24, TA 18, facet server module 26, and security framework 22. For example, any of the modules or elements within security framework 22 may readily be replaced, substituted, or eliminated based on particular needs. Furthermore, although described with reference to particular scenarios, where a given module (e.g. TE 24, TA 18, facet server module 26) is provided, any one or more of these elements may be provided externally, or consolidated and/or combined in any suitable fashion. In certain instances, certain elements may be provided in a single proprietary module, device, unit, etc. in order to achieve the teachings of the present disclosure.

Referring briefly back to certain internal structure that could be used to accomplish the teachings of present disclosure, instances of RC 14 can be associated with devices, customers, or end users wishing to receive data or content in the cloud system via some network. The terms RC, endpoint, client device, subscriber, and node are interchangeable and are inclusive of any devices used to initiate a communication, such as any type of receiver, a computer, a set-top box, an Internet radio device (IRD), a cell phone, a smartphone, a laptop, a tablet, a personal digital assistant (PDA), a Google Android™, an iPhone™, an iPad™, a Microsoft Surface™, or any other device, component, element, endpoint, or object capable of initiating voice, audio, video, media, or data exchanges within a communication architecture. RC 14 may also be inclusive of a suitable interface to the human user, such as a display, a keyboard, a touchpad, a remote control, or any other terminal equipment. RC 14 may also be any device that seeks to initiate a communication on behalf of another entity or element, such as a program, a database, or any other component, device, element, or object capable of initiating an exchange within a communication system. Data, as used herein in this document, refers to any type of numeric, voice, video, media, audio, or script data, or any type of source or object code, or any other suitable information in any appropriate format that may be communicated from one point to another.

In more general terms, TE 24, TA 18, facet server module 26, and security framework 22 are network elements that can facilitate, coordinate, and/or manage the security facet activities discussed herein. As used herein in this Specification, the term 'network element' is meant to encompass any of the aforementioned elements, as well as routers, switches, cable boxes, gateways, bridges, data center elements, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, TE 24, TA 18, facet server module 26, security framework 22, and/or RC 14 include software to achieve, foster, facilitate, coordinate, and/or manage the security facet activities discussed herein. This could, for example, include the implementation of instances of specific modules, engines and/or any other suitable element that would foster the activities discussed herein. Additionally, each of these elements can have an internal structure (e.g., a processor, a memory element, etc.) to facilitate some of the operations described herein. In other embodiments, these security facet activities may be executed externally to these elements, or included in some other network element to achieve the intended functionality. Alternatively, TE 24, TA 18, facet server module 26, security framework 22, and/or RC 14 may include software (or reciprocating software) that can coordinate with other network elements in order to achieve the activities described herein. In still other embodiments, one or several devices may include any suitable algorithms, hardware, software, components, modules, interfaces, or objects that facilitate the operations thereof.

In certain example implementations, the security facet functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by a processor [processors shown in FIG. 2], or other similar machine, etc.). In some of these instances, a memory element [memories shown in FIG. 2] can store data used for the operations described herein. This includes the memory element being able to store instructions (e.g., software, code, etc.) that are executed to carry out the activities described in this Specification. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the security facet activities, as outlined herein. Additionally, each of these devices may include a processor that can execute software or an algorithm to perform the security facet activities, as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the communication system discussed herein (and its techniques) are readily scalable and, further, can accommodate a large number of components, as well as more complicated/sophisticated arrangements and configurations. Accordingly, the examples provided should not limit the scope or inhibit the broad techniques of the communication system discussed herein, as potentially applied to a myriad of other architectures.

It is also important to note that the steps in the preceding FIGURES illustrate only some of the possible scenarios that may be executed by, or within, the communication system discussed herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the communication system discussed herein in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving a request to issue a first facet;
identifying an endpoint with a resource for which the first facet is valid;
identifying a set of actions capable of being performed on the resource;
creating the first facet based, at least in part, on the set of actions and first validity information, wherein the first validity information includes a count of use parameter, a time duration parameter, and a periodic time duration parameter that indicate a validity of the first facet;
issuing the first facet for a first entity, the first facet indicating the resource upon which the first entity is authorized to perform the set of actions;
creating a URL endpoint uniquely identifying the endpoint and comprising an action request for the resource;
identifying one or more input parameters for the action request; and
preassembling a facet URL based on the URL endpoint, the one or more input parameters, and the first facet, wherein the first facet is delegated from a second facet, the second facet comprising a set of capabilities indicating a plurality of resources upon which a second entity holding the second facet is authorized to perform actions, wherein the first facet includes a subset of the set of capabilities of the second facet, the subset containing fewer capabilities than the set of capabilities of the second facet, wherein the second facet comprises second validity information that indicates a validity of the second facet, wherein at least one parameter of the first validity information is reduced from the second validity information.

2. The method of claim 1, further comprising:
receiving an initial request from the second entity for the second facet;
determining whether the second entity has authorization to make the initial request; and
request a facet server module to issue the second facet.

3. The method of claim 1, further comprising:
determining whether the first entity has authorization to make a request for the first facet based on evaluating the first validity information against a policy.

4. The method of claim 1, further comprising:
identifying a capability type for the first facet;
modifying the capability type with values related to the first facet to form a specific capability type; and
adding the capability type to a capability set type, wherein the capability set type is associated with the first facet.

5. The method of claim 1, wherein the set of capabilities of the second facet indicates one or more services.

6. An apparatus comprising at least one processor and at least one memory, the at least one memory including computer program instructions that, when executed by the at least one processor, cause the apparatus to:
receive a request to issue a first facet;
identify an endpoint with a resource for which the first facet is valid;
identify a set of actions capable of being performed on the resource;
create the first facet based, at least in part, on the set of actions and first validity information, wherein the first validity information includes a first count of use parameter, a first time duration parameter, and a first periodic time duration parameter that indicate a validity of the first facet;
issue the first facet for a first entity, the first facet indicating the resource upon which the first entity is authorized to perform the set of actions;
create a URL endpoint uniquely identifying the endpoint and comprising an action request for the resource;
identify one or more input parameters for the action request; and
preassemble a facet URL based on the URL endpoint, the one or more input parameters, and the first facet, wherein the first facet is delegated from a second facet, the second facet comprising a set of capabilities indicating a plurality of resources upon which a second entity holding the second facet is authorized to perform actions, wherein the first facet includes a subset of the set of capabilities of the second facet, the subset containing fewer capabilities than the set of capabilities of the second facet, wherein the second facet comprises second validity information that indicates a validity of the second facet, wherein at least one parameter of the first validity information is reduced from the second validity information.

7. The apparatus of claim 6, wherein the memory further includes computer program instructions that, when executed by the at least one processor, cause the apparatus to:
receive an initial request from the second entity for the second facet;
determine whether the second entity has authorization to make the initial request; and
request a facet server module to issue the second facet.

8. The apparatus of claim 6, wherein the memory further includes computer program instructions that, when executed by the at least one processor, cause the apparatus to:
determine whether the first entity has authorization to make a request for the first facet based on evaluating the first validity information against a policy.

9. The apparatus of claim 6, wherein the memory further includes computer program instructions that, when executed by the at least one processor, cause the apparatus to:
identify a capability type for the first facet;
modify the capability type with values related to the first facet to form a specific capability type; and
add the capability type to a capability set type, wherein the capability set type is associated with the first facet.

10. A non-transitory computer readable media comprising instructions that, when executed, cause one or more processors to:
receive a request to issue a first facet;
identify an endpoint with a resource, where the first facet is valid;
identify a set of actions capable of being performed on the resource;
create the first facet based, at least in part, on the set of actions and first validity information, wherein the first validity information includes a count of use parameter, a time duration parameter, and a periodic time duration parameter that indicate a validity of the first facet;
issue the first facet for a first entity, the first facet indicating the resource upon which the first entity is authorized to perform the set of actions;
create a URL endpoint uniquely identifying the endpoint and comprising an action request for the resource;
identify one or more input parameters for the action request; and
preassemble a facet URL based on the URL endpoint, the one or more input parameters, and the first facet, wherein the first facet is delegated from a second facet, the second facet comprising a set of capabilities indicating a plurality of resources upon which a second entity holding the second facet is authorized to perform actions, wherein the first facet includes a subset of the set of capabilities of the second facet, the subset containing fewer capabilities than the set of capabilities of the second facet, wherein the second facet comprises second validity information that indicates a validity of the second facet, wherein at least one parameter of the first validity information is reduced from the second validity information.

11. The media of claim 10, wherein the instructions further cause the one or more processors to:
receive an initial request from the second entity for the second facet;
determine whether the second entity has authorization to make the initial request; and
request a facet server module to issue the second facet.

12. The media of claim 10, wherein the instructions further cause the one or more processors to:
determine whether the first entity has authorization to make a request for the first facet based on evaluating the first validity information against a policy.

13. The media of claim 10, wherein the instructions further cause the one or more processors to:
identify a capability type for the first facet;
modify the capability type with values related to the first facet to form a specific capability type; and
add the capability type to a capability set type, wherein the capability set type is associated with the first facet.

14. The media of claim 10, wherein the subset of the set of capabilities of the second entity indicates the resource.

* * * * *